April 17, 1962   J. F. GORDON   3,030,580
EXPANDED SCALE METER
Filed Feb. 11, 1959

INVENTOR.
James F. Gordon
BY
*Paul B. Hunter*
Attorney

United States Patent Office 3,030,580
Patented Apr. 17, 1962

3,030,580
EXPANDED SCALE METER
James F. Gordon, Santa Ana, Calif., assignor, by mesne assignments, to Pacific Scientific Company, San Francisco, Calif., a corporation of California
Filed Feb. 11, 1959, Ser. No. 792,490
3 Claims. (Cl. 324—131)

This invention relates to expanded scale alternating current measuring instruments or meters, and the invention has reference more particularly to a novel instrument of this character adapted for detecting slight changes on an expanded scale, the said instrument being especially suitable for monitoring alternating voltages.

Heretofore, most meters of the above character were inadequate for monitoring purposes, due to relatively small pointer displacement for slight variations in the monitored voltage. More complex displacement for slight variations in the monitored voltage. More complex instruments have been used having an expanded scale, but these instruments are quite complicated and expensive, employing at times a voltage sensitive bridge together with a phase sensitive demodulator responsive to the output of the bridge and a meter responsive to the balance of the demodulator. Other instruments have been employed of the D'Arsonval type using specially shaped pole pieces, thereby obtaining a non-linear output indication which functions as a sort of restricted range device.

The present invention provides a relatively simple and inexpensive expanded scale meter employing a voltage sensitive non-linear impedance bridge circuit balanced at a particular value of input voltage level to develop with variations in input an unbalanced voltage reversible as to phase and variable as to magnitude, to indicate on an expanded scale the deviation of the input voltage or signal either above or below such level. Thus, substantially a full scale pointer deflection is provided for relatively small changes in the monitored voltage or current, as the case may be.

The object of the present invention is, therefore, to provide an alternating current meter especially suitable for monitoring performances which will detect slight voltage changes by a substantial deflection of an indicator forming part of the invention.

A feature of the present invention is to provide a novel expanded scale meter of the above character in which some of the elements of the meter perform a plurality of functions, thereby simplifying the structure thereof, the said novel meter being adapted to be frabricated to suit any desired scale range of the voltage or current being measured.

Another feature of the present invention is to provide a novel meter of the above character that operates independently of variation in supply frequency.

Still another feature of the invention is to provide an instrument having a substantially linear relationship between the input signal and the output indication, such indication being substantially unaffected by harmonic distortion of the input wave form.

These and other features and advantages of the present invention will become apparent from a perusal of the following specification taken in connection with the accompanying drawings wherein.

Similar characters of reference are used in the above figures to designate corresponding parts.

Figure 1:
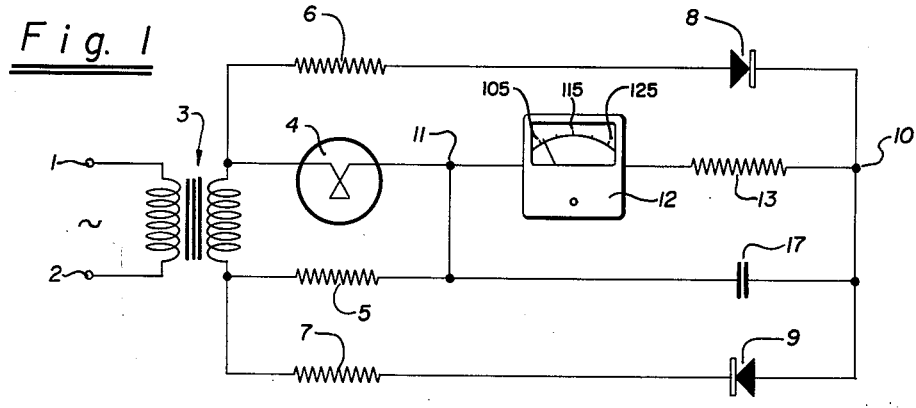
FIG. 1 is a wiring diagram of an elemental form of the novel expanded scale meter of the present invention.

Referring now to FIG. 1 of the drawings, the desired voltage or current to be measured or monitored is applied to leads 1 and 2 including the primary of transformer 3, the secondary of which transformer feeds a circuit branch consisting of resistances 4 and 5 in series. Resistance 4 is a non-linear resistance, i.e., preferably one whose resistance increases with current. For example, this resistance 4 might be a tungsten lamp which rises to a very high temperature when normal voltage is applied thereto, so that a small change in current, due to a change in voltage, will, because of the temperature coefficient of resistance to tungsten, produce an appreciable change in lamp resistance. However, other non-linear elements may be used in place of a tungsten lamp. The resistance 5 is preferably a wire wound resistor which is relatively unaffected by ambient temperature. However, if desired, a resistor having a temperature coefficient of resistance opposite that of the resistor 4 could be used which would enhance somewhat the sensitivity of the instrument. It is obvious that, for any given current through resistor 4, it is possible to select an equal value for resistor 5, and, in that event, the voltage drop across 4 and 5 will be equal.

The secondary of transformer 3 also feeds a second circuit branch consisting of linear resistances or resistors 6 and 7 in series with diode rectifiers 8 and 9, which rectifiers serve to effect half-way rectification, so that a pulsating D.-C. current flows in the series circuit including these elements upon the application of a signal to leads 1 and 2. Thus it will be seen that a bridge circuit is provided wherein equilibrium may be established for a one-half cycle period between points 10 and 11 provided proper values of the impedance elements are selected. Therefore, this bridge will be in balance if the impedances of 4 and 5 are the same and those of 6 and 7 are the same. Thus, if the impedances of 4, 5, 6, and 7, are designated R1, R2, R3, and R4, the following formula obtains:

$$\frac{R1}{R2}=\frac{R3}{R4}$$

Figure 2:
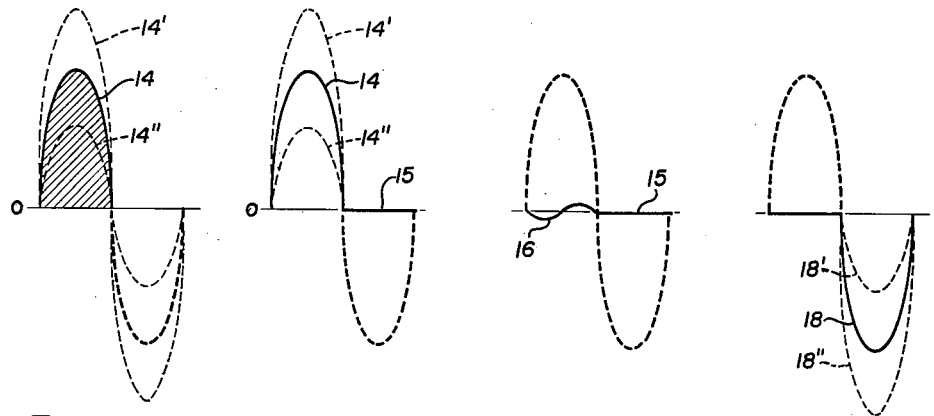
FIG. 2 shows graphs illustrating the operation of the meter.

An expanded scale meter 12 and a sensitivity resistance 13 are shown connected in series between points 10 and 11, the meter, by way of example, being shown as having an expanded scale extending from 105 to 125 volts on which scale the 115 or mid-point reading would be the normal value of the voltage to be monitored and the 105 volt position would be the normal position at the left of the scale for the pointer when the current through the meter was zero. With the bridge unbalanced, i.e., with the minimum normal operating voltage of 105 being supplied to the primary terminals 1 and 2 of the transformer 3, the meter 12 will read at its zero current or 105 volt position, indicating that the points 10 and 11 are at identical D.C. potentials. Since the current through diodes 8 and 9 is pulsating in nature, the comparison of currents takes place during the diode conducting half-cycle only, and the wave form of the pulsating diode current passing through resistance 13 and the meter 12 is shown, for example, in FIG. 2 wherein the solid black line curve 14 illustrates the potential wave form through resistance 13 and the meter 12 when the effective resistance of resistor 4 is greater than that of resistor 5, this being the condition, for example, which would exist for a mid-scale reading of 115 volts on the meter. Current flows at all time through the diodes during the conducting half cycle regardless of whether bridge balance exists as long as a potential is applied to terminals 1 and 2 of transformer 3. During the balance condition, no current flows through the resistance 13 and the meter 12 except for a residual alternating current largely second harmonic in nature, since transformers and input voltages are rarely ideal. Since the residual current is alternating, it has a negligible effect on the position of the direct current meter 12. Any possible effect is further reduced by the use of a suitable damping capacitor 17 in shunt with the meter 12 and the resistance 13. Capacitor 17 further serves to integrate to the desired extent the pulsating unbalance current and thus increases the efficiency of the rectifier action whenever the bridge unbalance is sufficient to cause current to flow through the resistance 13 and the meter 12. During the unbalance condition, for example, when the input voltage applied to terminals 1 and 2 of transformer 3 is more than 105 volts and since then the current sensitive resistance 4 becomes greater than R5 the current through diode 8 increases and the current through diode 9 decreases by approximately the value of the current which flows through the resistance 13 and the meter 12. When the input voltage to terminals 1 and 2 of transformer 3 falls below its normal minimum value, for example, 105 volts, the unbalanced pulsating current flowing through resistance 13 and meter 12 is opposite in sign due to a reversal in phase in the bridge output. This condition maintains the meter pointer off to the left of scale for all input voltage values, for example, of less than 105 volts. This current characteristic eliminates any ambiguous reading of the scale in the event a voltage of less than 105 volts, for example, is applied to terminals 1 and 2 of transformer 3.

In a typical instrument made in accordance with the teachings of this invention, the following slight variations in scale degradation took place due to the presence of harmonics:

| Harmonic No. | Harmonic Percent | ± Percent Scale Degradation |
| --- | --- | --- |
| 2 | 5 | .15 |
| 3 | 5 | .15 |
| 4 | 5 | .15 |
| 2 | 10 | .5 |
| 3 | 10 | .3 |
| 4 | 10 | .3 |
| 2 | 20 | .6 |
| 3 | 20 | .75 |
| 4 | 20 | .6 |

Figure 3:
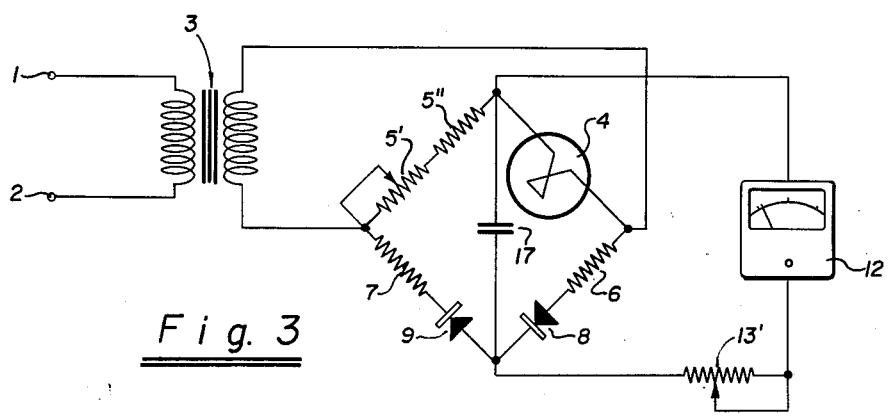
FIG. 3 is a wiring diagram of a typical meter of the present invention.

FIG. 3 illustrates the novel meter of this invention in the classical Wheatstone diamond bridge form. In this form of the invention, the resistor 5 in one bridge arm has been replaced by two resistors 5' and 5" of which 5' is adjustable to vary the operating range of the instrument and the sensitivity resistor 13' is shown adjustable likewise.

Obviously, the magnitudes of the resistances can be varied to suit variations in the input voltage, or, if desired, a variable resistance could be put into the input leads 1 and 2 to accomplish this result.

The present instrument is essentially an R.M.S. indicating instrument with its sensitivity to harmonic distortion extremely low, as above indicated. If desired, a graphic recorder may be substituted for the meter 12 to accomplish a permanent record of the voltage fluctuations in any given period of time, or relay means could be energized from the output for regulating controlled equipment such as a furnace.

Thus, it will be seen that the novel instrument of the present invention greatly improves the readability and hence the usable accuracy of meters of this type, and employs a relatively simple and novel combination of electrical elements producing a bridge circuit which is insensitive to applied voltage until a predetermined operating zone is reached having a mean normal level, and, thereafter, slight variations above or below this normal level are monitored and clearly indicated. An improvement in readability occurs which is approximately the ratio of the full value of the applied voltage to the restricted scale range. For example, if the applied voltage is 120 and the scale range is 105 to 125, then the reading accuracy is improved by 120 to 20, or six times.

Since many changes could be made in the above construction of the novel expanded scale meter of this invention and many apparently widely different embodiments of this invention could be made without departing from the scope thereof, it is intended that all matter contained in the description or shown in the accompanying drawings shall be interpreted as illustrative and not in a limiting sense.

What is claimed is:

1. In an expanded scale meter, a bridge circuit comprising a pair of circuit branches having their respective terminals connected together whereby said branches are in shunt with respect to each other, means for connecting a voltage to be monitored across the terminals of said branches, each such branch having two arms connected in series, one of said branches having a non-linear resistance in one arm and a linear resistance in the other, the point of juncture of said non-linear and said linear resistances providing one potential measurement point, the second of said branches having a half-wave rectifier and a series-connected linear resistance in each of its arms, said rectifiers being similarly polarized, the juncture of said arms of said second branch serving as a second potential measurement point, and an expanded scale voltmeter connected across said bridge circuit measurement points for indicating the magnitude of the monitored voltage.

2. An expanded scale meter as defined in claim 1 comprising a transformer having its primary connected for receiving the voltage to be monitored and a secondary connected across the terminals of said circuit branches, the half-wave rectifiers of said second circuit branch conducting unidirectionally and in series during the operation of said voltmeter, whereby the latter's indications are responsive to half-wave rectification of the monitored voltage, and a capacitor connected in shunt with said voltmeter serving to integrate the half-wave unbalanced current output of said bridge circuit while having negligible reactance with respect to said transformer.

3. An expanded scale meter for monitoring alternating voltage signals, comprising a bridge circuit having two branches with their respective ends respectively connected together, means for connecting the alternating voltage to be monitored to the ends of said branches whereby said branches are in shunt with respect to the monitored voltage, one of said branches comprising a non-linear and a substantially linear resistance in series and the second branch comprising a substantially linear resistance, a pair of similarly polarized rectifiers and a second substantially linear resistance all in series, said meter operating so that at a particular value of the input signal the said bridge is balanced, and an expanded scale voltmeter having one side connected to a point between the non-linear resistance and the linear resistance of said first branch and its other side connected to a point between said similarly polarized rectifiers, whereby pulsating output is provided by said bridge circuit upon slight variations of the signal from said particular balanced voltage value producing relatively large deflections of said voltmeter.

References Cited in the file of this patent

UNITED STATES PATENTS

| 2,747,161 | Dreyer | May 22, 1956 |
| 2,781,505 | Grant | Feb. 12, 1957 |
| 2,873,428 | Bruno | Feb. 10, 1959 |

FOREIGN PATENTS

| 690,201 | Great Britain | Apr. 15, 1953 |
| 691,862 | Great Britain | May 20, 1953 |